No. 660,562. Patented Oct. 30, 1900.
J. DAVIDSON & T. R. HAMPSON.
STEAM ENGINE.
(Application filed June 6, 1899.)
(No Model.) 3 Sheets—Sheet 1.
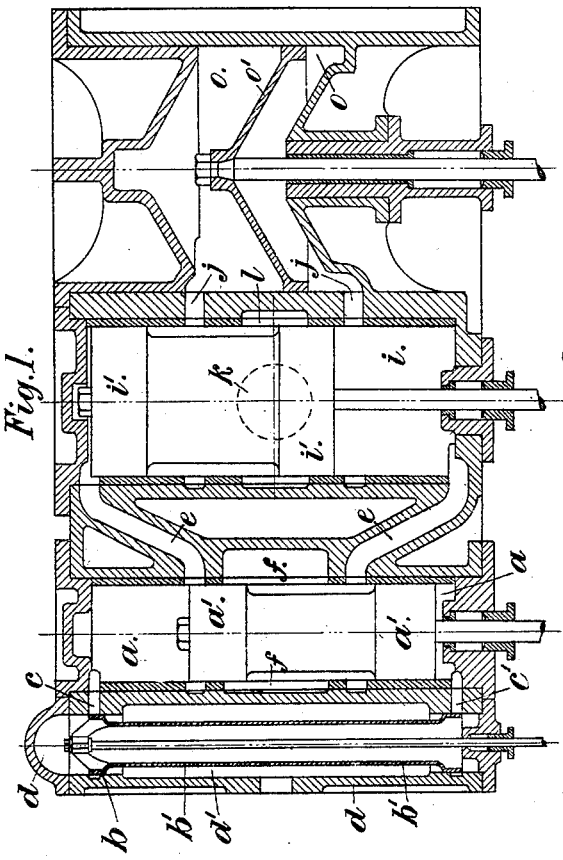
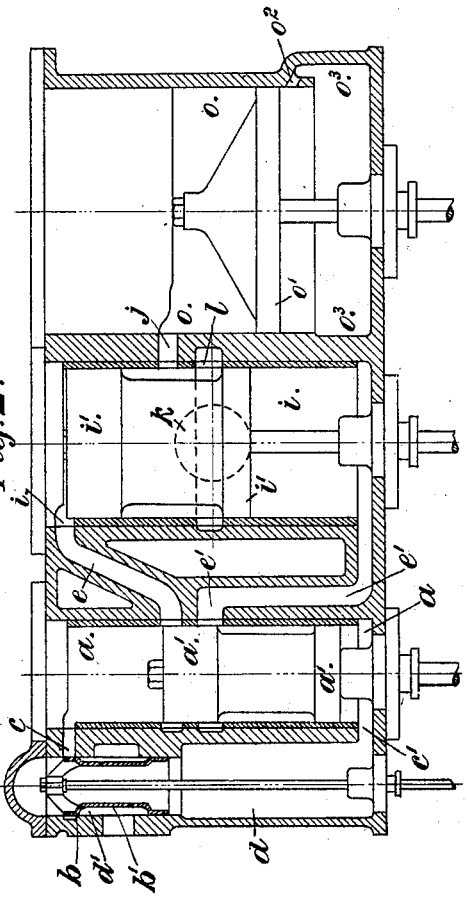

No. 660,562. Patented Oct. 30, 1900.
J. DAVIDSON & T. R. HAMPSON.
STEAM ENGINE.
(Application filed June 6, 1899.)
(No Model.)
3 Sheets—Sheet 2.

No. 660,562. Patented Oct. 30, 1900.
J. DAVIDSON & T. R. HAMPSON.
STEAM ENGINE.
(Application filed June 6, 1899.)
(No Model.) 3 Sheets—Sheet 3.
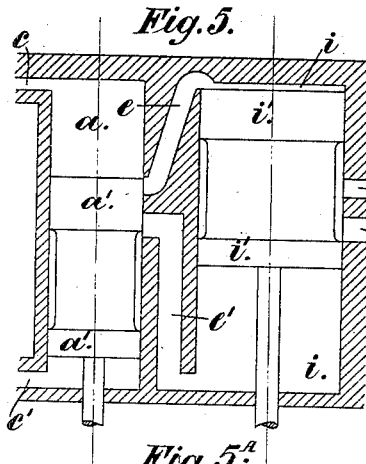
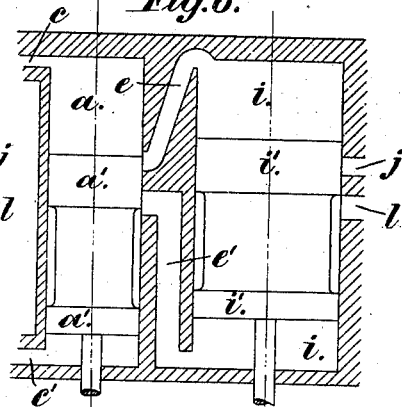
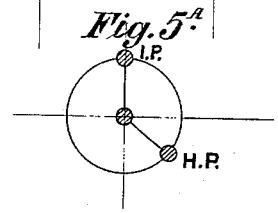
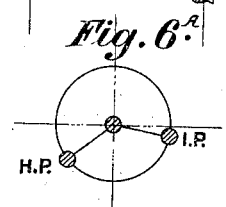
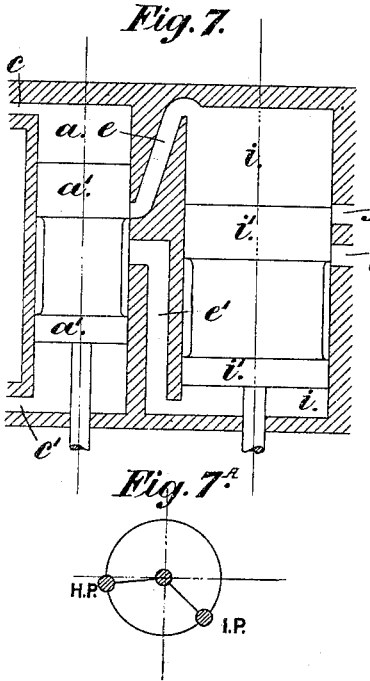
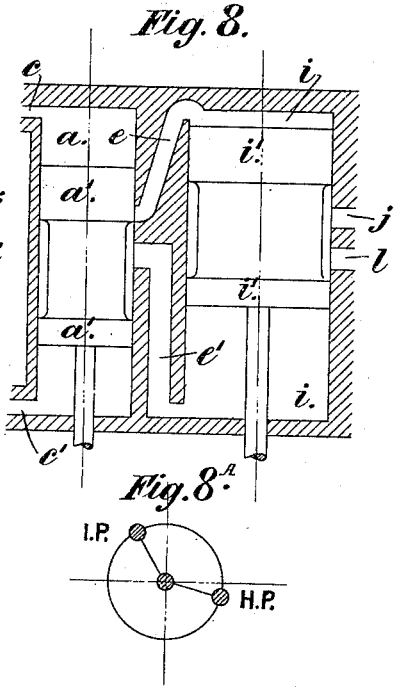
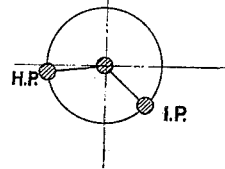
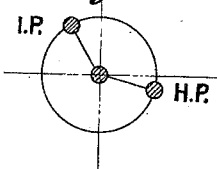
Witnesses.
Ella L. Giles
Inventors
John Davidson
Thomas Reginald Hampson
BY
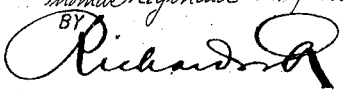
ATTORNEYS
THE NORRIS PETERS CO., PHOTO-LITHO., WASHINGTON, D. C.

UNITED STATES PATENT OFFICE.

JOHN DAVIDSON, OF ECCLES, AND THOMAS REGINALD HAMPSON, OF CHESTER, ENGLAND.

STEAM-ENGINE.

SPECIFICATION forming part of Letters Patent No. 660,562, dated October 30, 1900.

Application filed June 6, 1899. Serial No. 719,591. (No model.)

*To all whom it may concern:*

Be it known that we, JOHN DAVIDSON, a resident of Eccles, and THOMAS REGINALD HAMPSON, a resident of Chester, England, subjects of the Queen of England, have invented certain new and useful Improvements in Steam-Engines, of which the following is a specification.

This invention has reference mainly to steam-engines of the triple compound type—that is to say, an engine in which the expansion of the steam is carried out in three separate cylinders of successively-larger diameter.

The object of the invention has been chiefly to construct an engine that will give an even-turning effort to the shaft and at the same time to be very simple yet economical and be capable of running at high speed, and, furthermore, to so arrange and operate an engine of this type that only one steam-distribution valve and valve-gear is required and used.

The improvements in steam-engines according to our invention are illustrated in the accompanying drawings, and they will be described by the aid of these drawings, the same letters of reference being used in the several views representing the different modifications to denote the same or equivalent parts wherever they occur.

Figure 3:
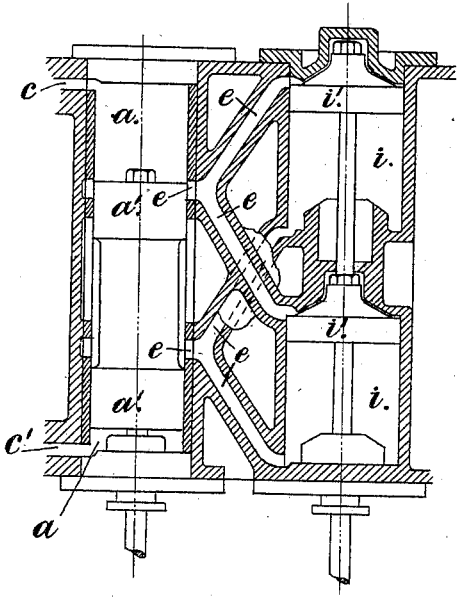
Figure 4:
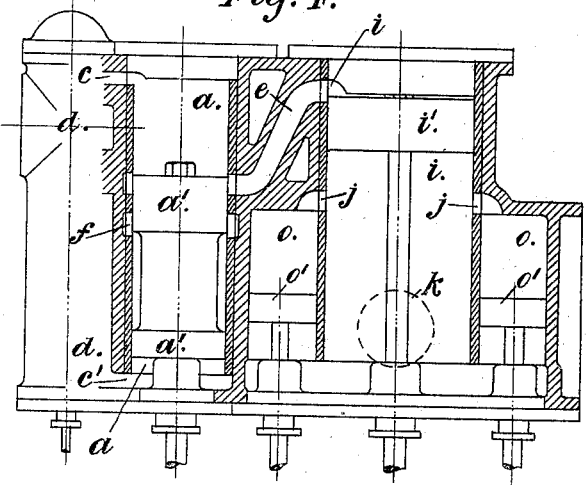

In the drawings, Figure 1 is a sectional elevation showing a double-acting engine provided with our improvements. Fig. 2 is a sectional elevation illustrating our improvements as applied to a single-acting engine. Fig. 3 shows a modification of a duplex tandem engine according to our invention. Fig. 4 shows a modification under the invention, in which the intermediate and low pressure cylinders are in annular arrangement. Figs. 5, 6, 7, 8, $5^A$, $6^A$, $7^A$, and $8^A$ are diagrammatic views illustrative of the relative positions of pistons and ports of the high-pressure and intermediate-pressure cylinders and different relative positions of the cranks at different points of the strokes in the case of the single-acting engine shown in Fig. 2.

Referring now to the drawings, and in the first instance to Fig. 1, $a$, $i$, and $o$ are high-pressure, intermediate-pressure, and low-pressure cylinders, respectively, of the engine, and $a'$, $i'$, and $o'$ are the pistons of these three cylinders, respectively.

$b$ is the one steam-distribution valve of the engine distributing steam to the high-pressure cylinder. In the case shown this valve is of the piston type, the upper and lower heads or ends of which work over and in connection with the steam-ports $c$ and have a tubular stem $b'$ connecting them together. Steam is introduced into the annular space $d'$ of the valve-case $d$, about the tubular part $b'$ of the valve, the steam-lap of the pistons of the valve being on their inside edges, and the space within the valve and the ends of the valve-case constitute the receiver-space to this the first cylinder of the engine.

The pistons of the cylinders are connected to their respective cranks by piston-rods and connecting-rods in any suitable or known way.

The piston $a'$ of the high-pressure cylinder $a$ is a double piston, the part between the piston-heads of which is of smaller diameter and forms an annular passage or port about it. The exhaust-steam from the cylinder $a$ is controlled by the piston $a'$, and the flow from this cylinder to the intermediate-pressure cylinder is by way of ports $e$, the openings of which into the cylinder $a$ (which, say, extend all around) are governed by the piston-heads $a'$, while the space $f$ about the central portion of these piston-heads and the cylinder-casings communicating with it constitutes the receiver to the intermediate cylinder. The openings of the ports $e$ out of the cylinder $a$ are near the ends of the stroke of these pistons $a'$ in the opposite ends of the cylinder $a$, and the openings of the ports $e$ into the opposite ends of the cylinder $i$ are at the outer ends of this cylinder. The piston $i'$ of this intermediate cylinder is an elongated double-headed piston and serves to control the supply of exhaust-steam from its cylinder $i$ to the low-pressure cylinder $o$, the ports communicating between $i$ and $o$ being designated $j$. The piston $i'$ is similar to $a'$, and the central part joining the two heads is of reduced diameter and constitutes a passage, serving as an exhaust-passage in the cylinder from the low-pressure cylinder $o$ to an opening $k$, (shown in dotted lines in the cylinder $i$,) constantly open to this annular port of $i'$. The steam-ports $j$, as will be seen, are short and lead directly from the cylinder $i$ to the cylinder $o$. Consequently the clearance capacity is small and waste of steam in the low-pressure-cylinder ports avoided.

In action when the high-pressure piston $a'$ is at the extreme end of its stroke at one end of the cylinder $a$ the steam-port $c$ belonging to that end is uncovered by the head of the piston-valve $b$ and steam enters the cylinder and the supply is continued for the desired portion of the stroke of the high-pressure piston when it is cut off by the valve. Then when the cylinder approaches the outer end of its stroke—say about the point as illustrated in the crank diagram in Fig. 5$^A$ and also shown in Fig. 5—one of the piston-heads $a'$ uncovers one of the ports $e$ and steam exhausts from $a$ to one end of the ends of the intermediate-pressure cylinder $i$, and this communication is continued until the high-pressure piston has reached a certain point in the upward stroke—viz., the point at which opening commenced when it closes this port $e$ and the steam admitted to $i$ expands. This point of cut-off will be about that represented in Figs. 6 and 6$^A$. Then the steam in $i$ expands until the piston has reached a point, as shown in Fig. 7, which is equivalent in its stroke to the point reached by the crank of the intermediate-pressure piston, (shown in Fig. 7$^A$,) when it uncovers one of the ports $j$ and the steam exhausts from $i$ into the low-pressure cylinder $o$, the piston of this cylinder being at or near the end of one of its strokes. This communication will continue during the portion of the stroke of $c'$ until a point in the return stroke of $i'$ is reached which corresponds to the point at which the opening to $o$ commenced, when it is cut off and expands. When the piston $o'$ has reached the end of its stroke, the cylinder $o$ will be put in communication with the exhaust-port $l$ and the opening $k$ by the uncovering of the port $j$ by the inner edge of the piston $i'$. This communication is maintained until the piston $o'$ has traveled the greater portion of its stroke, when compression commences. During a portion of the return stroke of the high-pressure piston $a'$—namely, from about the point indicated in Figs. 6 and 6$^A$—the piston will be compressing into the receiver—that is, the space inside the valve $b$ and the ends of the valve-case $d$—and when this communication is cut off and steam supplied from the annular port $d'$ the opposite end of the cylinder $a$ will then be put in communication with the internal space of $b$, which acts as the receiver then for this end.

With regard to the exhaust from the nonactive end of the intermediate-pressure piston $i'$, while steam is acting at the opposite end on the piston this end will be in communication with the spaces $f$, and that for a portion of its stroke the entrance of the port $e$ will be uncovered to the inner edge of the piston-body $a'$ at that end, and it will remain open until this inner edge closes it, when compression in $i$ commences. The steam is compressed until the end of the stroke of the piston $i'$ is reached, when the steam from the high-pressure cylinder passes from it into $i$. The duration of this compression depends upon the length of the piston-bodies $a'$ and the proportion of the stroke which it takes in moving between the point at which $e$ is closed by the inner edge of the piston-body and that when the opening of it takes place by the outer edge of the piston-body. Then, with regard to the operations within the low-pressure cylinder on the side of the piston which is not being acted on by steam, the steam will be exhausted by way of the port $j$, the annular space around the intermediate part between the piston-heads $i'$, and the outlet $k$, for the greater part of its stroke, when the port $j$ will be closed by the inner edge of one of the ends of the piston $i'$ and compression in $o$ will take place until this port is open to one of the ends of the cylinder $i$ by its being uncovered by the back edge of $i'$.

Obviously the exact degree in the relative positions of the three cranks and pistons of this engine at which the openings and closings of the several ports take place may vary to a considerable degree; but we will now describe and trace, as an example, the distribution of steam and the periods in the strokes of the several pistons at which admission, release, closing, compression, and other factors in the complete operation in the engine with regard to steam distribution from the point of admission of steam of full pressure to that of the discharge from the low-pressure cylinder. This example, of course, will be within the limits of the range of variations at which these several actions and functions can take place, and its employment will give a satisfactory and economical result as a whole and throughout the engine. The engine in connection with which these complete operations will be described is a double-acting three-crank engine, as illustrated in Fig. 1.

With regard to the relative arrangement of cranks, assuming the intermediate-pressure-cylinder crank to be taken as the one in relation to which the others are to be considered, then the high-pressure crank may lead the intermediate-pressure-cylinder crank by about one hundred and twenty-seven degrees and the intermediate-pressure crank will lead the low-pressure crank by about one hundred and thirty-two degrees of the circle. The lead of the low-pressure over the high-pressure cylinder will therefore be one hundred and one degrees.

First, with regard to the admission of steam to the high-pressure cylinder. This is under the control of the valve $b$ and its admission and operation may take place in the usual way, and it may therefore be admitted and cut off at the cylinder-ports $c$ at practically any point, or it may also, if desired, be under the control of an automatic shaft-governor. Assuming, then, so much, the behavior, actions, &c., of the various pistons acting as valves in the distribution and manipulation of the steam throughout the engine will now be specified.

*High-Pressure Piston as the Valve of the Intermediate Cylinder.*

*Top end.*—The piston $a'$ opens port $e$ to intermediate-pressure cylinder at eighty-three per cent. of downstroke, and closes this port at seventeen per cent. of upstroke. After this the steam in the cylinder $a$ in the remaining part of upstroke is in communication with its receiver—viz., the interior of the valve $b$—and is then compressed prior to steam-opening.

*Bottom end.*—The piston $a'$ opens port $e$ to the intermediate-pressure cylinder at seventy-six per cent. of upstroke and closes the port at twenty-four per cent. of downstroke, this end of the cylinder being open to the receiver for the remaining portion of the stroke, as just described.

*Intermediate-Pressure Cylinder.*

*Top end.*—Steam enters from high-pressure cylinder for sixty-five per cent. of downstroke, when it is cut off by the high-pressure piston. The steam then expands for a period, and at eighty-two per cent. of its downstroke it opens the port $j$ to the low-pressure cylinder, and it—that is, the piston $i'$—closes this port at about 17.5 per cent. in its upstroke. The opening to the receiver of the other end of the cylinder may take place simultaneously with the opening of the low-pressure cylinder, in which case the compression will take place during 6.25 per cent. of the stroke of the piston, or this opening to the receiver may take place at a point representing ninety per cent. of the stroke, in which case the compression will be about fifteen per cent. of the stroke.

*Bottom end.*—Steam enters this end from the high-pressure cylinder for sixty per cent. of the stroke of $i'$. It is then cut off, and subsequently at seventy-six per cent. of the stroke of $i'$ it opens the port $j$ to the low-pressure cylinder, and then closes this port at twenty-four per cent. of its downstroke. The compression in this cylinder will be five per cent. of the stroke in the case of the opening to the receiver, being simultaneous with the opening to the low-pressure cylinder, and fifteen per cent. compression if the opening to the receiver takes place at ninety-two per cent. of the stroke.

*Low-Pressure Cylinder.*

*Top end.*—Steam from the intermediate-pressure cylinder enters this cylinder for sixty-six per cent. of the stroke of its piston, when it is cut off from intermediate-pressure cylinder by the piston $i'$ closing the port $j$. It then expands, and at ninety-two per cent. of the stroke it is released and passes away by the port $l$ and annular space around the piston to the outlet $k$, and the compression at the end of the stroke will be fifteen per cent.

*Bottom end.*—With regard to this end of this cylinder the cut-off, release, and compression will be sixty per cent., ninety-three per cent., and fifteen per cent., respectively, of the stroke.

Referring now to the modification shown in Fig. 2, this shows a single-acting engine having the main general characteristics and arrangements of the engine shown in Fig. 1. In this case the admission, distribution, and exhaust of the steam to and from the several cylinders in their active strokes may be taken to be substantially similar to that set forth with reference to Fig. 1; but the idle or non-active ends of the cylinders in this case are somewhat modified, and they are as follows: The receiver to the high-pressure cylinder and piston is the space within the casing $d$ and within the tubular part $b'$ of the valve $b$—that is, the greater parts of the valve-casing—and it is in constant communication with the lower end of the cylinder $a$ by the ports $c'$, the upper steam-port $c$ only being controlled by the valve $b$. The idle end of the intermediate-pressure cylinder forms a receiver to the upper end of the cylinder, as in the upstroke of the piston $a'$, and during the upstroke of $i'$ the upper end of this cylinder $i$ is put in communication with the lower end by the annular passage around the intermediate part of the piston $a'$, which puts the port $e$ in communication with the bottom end of $i$ by a port $e'$. The idle end of the low-pressure cylinder $o$ has a receiver or chamber $o^3$, which is always in communication with the exhaust, and at the outer ends of the stroke of the piston $o'$ this piston by uncovering a port $o^2$, communicating between $o^3$ and the upper side of the cylinder, forms a natural drain for this cylinder.

Figs. 5 $5^A$ to 8 $8^A$ illustrate, diagrammatically, several relative positions of the pistons of the high and intermediate pressure cylinders during the moments of important actions of steam distribution, manipulation, and use in the several cylinders, and the positions of the cranks connected with these cylinders in the stroke corresponding with these positions. For instance, Figs. 5 and $5^A$ illustrate the point of exhaust from the cylinder $a$ to the cylinder $i$, Figs. 6 and $6^A$ illustrate the point of cut-off of steam from $a$ to $i$, Figs. 7 and $7^A$ illustrate the point of putting the upper and lower ends of the cylinder $i$ in communication with each other and so making the cylinder its own receiver, while Figs. 8 and $8^A$ illustrate the point at which this communication is cut off and compression in $i$ begins. Figs. 5 to 8 also illustrate the controlling action of the intermediate-pressure piston $i'$ in connection with the admission and exhaust ports $j$ and $l$ of the low-pressure cylinder o, showing the periods in the stroke of the piston $i'$ at which these ports $j\ l$ are open to the interior of $i$, closed wholly by the piston $i'$, and are in communication with each other while out of communication with $i$.

Fig. 4 shows the arrangement of a triple compound engine having a distribution of steam and a mode of action substantially similar to that set forth with reference to Fig. 2; but the arrangement of the cylinders is different. The low-pressure cylinder $o$ instead of being at the side of the intermediate cylinder $i$ is at once both in tandem arrangement with it and concentric—that is to say, the cylinder $o$ is at a lower level than the part of the cylinder $i$ which is traversed by the piston $i'$, and the cylinder $o$ and piston $o'$ are annular, the septum between $o$ and $i$ being the continuation of the cylinder $i$. In this case, as in the others above described, the exhaust-port $j$ from the intermediate-pressure cylinder to the low-pressure cylinder is short and the clearance in the cylinders $o$ is therefore small, and this port is uncovered by the piston $i'$ during the outer portion of its stroke for the exhaust of steam from $i$ to $o$, while during most of the upstroke prior to closing for compression the ports $j$ form a communication between the upper part of the cylinder $o$ and the lower part of both cylinders $o$ and $i$, which are common and which are open to the exhaust by means of the pipe $k$. In this case there will be two low-pressure cranks instead of one, as in the above engines.

The engine shown in Fig. 3 is a modification of the double-acting engine shown in and set forth with reference to Fig. 1. In it in lieu of the single intermediate-pressure cylinder two of such cylinders are employed in tandem arrangement one above the other, the pistons $i'$ being on the same connecting-rod. In this case the ports $e$, communicating with the cylinder $a$, are bifurcated, one part leading to the upper cylinder and the other to the lower cylinder. Thus the double piston $a'$ of the high-pressure cylinder $a$ serves also as a valve for the distribution of steam from this cylinder to the two intermediate-pressure cylinders $i$, and in like manner the steam from the cylinders $i$ may be distributed in two other low-pressure cylinders, or, as a modification of this, a three-crank engine with one valve may have one high, one intermediate, and two low pressure cylinders acting in the manner described. Engines of this latter character under Fig. 3 and its modifications will provide a high power with a short length of engine and a small space occupied.

Although the invention has been mainly described as applied to an inverted vertical engine having three cylinders side by side, it is not restricted to this arrangement, as it may be applied to engines having different positions and to different relative arrangements in which the expansion of the steam is carried out in three stages.

What is claimed in respect of the herein-described invention is—

In combination in a triple compound steam-engine, three cylinders, $a$, $i$ and $o$, a valve-casing having a passage at each end leading to the cylinder $a$, a tubular valve having heads controlling said passages, a passage leading from the intermediate part of cylinder $a$ to the opposite ends of cylinder $i$, a valve in cylinder $a$ having heads for closing said passages, an intermediate portion to form a continuation of the said opening leading directly through the intermediate part of the walls of cylinder $i$ into opposite end of cylinder $o$, a piston on said cylinder $i$ having heads for closing said openings and an intermediate part adapted to put the same in communication with an exhaust-opening, a crank-shaft, a piston in cylinder $o$, and pitman connections between said piston and said crank-shaft.

In witness whereof we have hereunto set our hands in presence of two witnesses.

JOHN DAVIDSON.
THOS. REGINALD HAMPSON.

Witnesses:
WILLIAM CASH,
JNO. E. WALKER.